July 14, 1931.                A. POTIGIAN                1,814,334
                               TRIPOD FOOT
                            Filed Sept. 19, 1928

A. POTIGIAN    INVENTOR.

BY
Merrill M. Blackburn
    ATTORNEY.

Patented July 14, 1931

1,814,334

UNITED STATES PATENT OFFICE

ARMEN POTIGIAN, OF DAVENPORT, IOWA

TRIPOD FOOT

Application filed September 19, 1928. Serial No. 306,871.

The present invention pertains to an attachment to be placed upon the legs of a tripod to prevent the same from slipping upon smooth hard surfaces when used upon the same. It is well known that the ordinary feet of camera tripods are quite likely to slip when used upon a polished floor, marble floor, or the like and the purpose of this invention is to provide a device which can be attached to the lower ends of the tripod legs to prevent same from sliding on such surfaces. Among the further objects of this invention are to provide a device of the character indicated which is simple in construction and yet is efficient for the purpose indicated; to provide a device of the character indicated which is inexpensive to manufacture but is nevertheless durable in use; to provide a device of the character indicated which can be readily attached to each of the legs of a tripod to accomplish the desired purposes; and such further objects advantages and capabilities as will hereafter appear and as are inherent in the construction disclosed herein. My invention further resides in the combination, construction, and arrangement of parts illustrated in the accompanying drawings, and, while I have shown therein what is now considered the preferred embodiment of this invention, I desire the same to be understood as illustrative only and not as limiting said invention.

Figure 1:
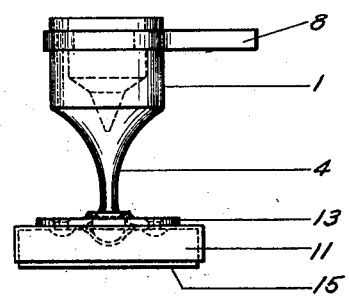
Figure 2:
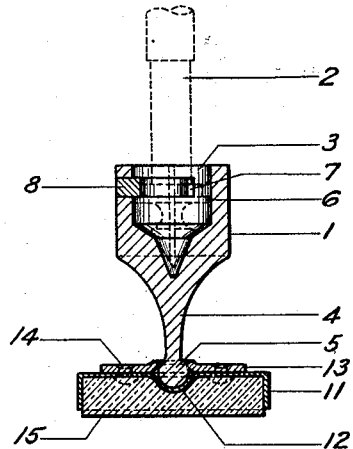
Figure 3:
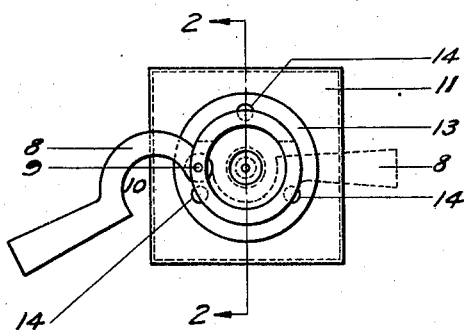

In the drawings attached hereto and forming a part hereof Fig. 1 shows my improved device in elevation; Fig. 2 shows a longitudinal section thereof with a portion of the tripod leg shown in dotted outline, the section being taken substantially along the plane indicated by line 2—2, Fig. 3; Fig. 3 is a plan view of the construction shown in Fig. 1 with the locking device shown in two positions.

Referring more in detail of the drawings, numeral 1 designates generally a socket member to be attached to the lower end of a tripod leg 2, said socket member being provided in one end with a socket 3. The opposite end of the member 1 is elongated and narrowed as at 4 and this narrowed portion terminates in a ball 5 which serves as one element of a ball and socket joint. It is customary for tripod legs to have near their lower ends a flange 6. In constructing my tripod foot, I provide the same with a slot 7 in which is pivotally mounted a locking member 8 which swings upon a pivot 9. This locking member has an arcuate recess 10 upon one side which receives the tripod leg and permits the locking member to swing in to a position above the flange 6 thereby preventing detachment of the foot from the leg.

A socket member 11, consisting of a plate having its edges bent down to form flanges, has its central portion depressed as indicated at 12 to co-operate with the ball 5 in forming a ball and socket joint. A substantially centrally apertured plate 13 has the edge of the metal around the aperture pressed outwardly to form another portion of the ball and socket joint. This plate is secured to the socket member 11 by any suitable means such as rivets 14. Within the socket 11 is mounted a piece 15 of suitable material, such as a rubber block, to adhere to the surface upon which the tripod is to be supported.

It will be evident from the drawings and the foregoing description that the locking means 8 may be swung outwardly upon its pivot 9 and one of these devices attached to each of the legs of the tripod, the locking device being then turned into the dotted line position shown in Fig. 3. In this position the foot will be held in place upon the tripod leg and prevent the same from slipping when used in connection with hard smooth surfaces. It is also obvious from the foregoing disclosure that this device will fulfill the objects recited above.

Having now described my invention, I claim:

1. In a structure of the character described, a socket member having a substantially cylindrical opening in the interior for the end of a tripod leg and having a slot in a wall thereof for the reception of a locking member, a locking member in said slot and pivoted to swing from a position entirely external to the cylindrical opening to a position partially closing the same whereby a tripod leg may be held within said opening.

2. In a structure of the character described, a pair of socket members connected by a ball and socket joint, means in one of said sockets to adhere to a smooth surface upon which the device may be resting, the other socket member being adapted to receive an end of a tripod leg, and means cooperating therewith to secure the tripod leg in the socket, said last named means being pivoted and swinging transversely of the leg and into engagement therewith to hold the leg and structure assembled.

3. In a tripod foot, a pair of socket members having a ball and socket connection between them, one of said socket members being adapted to receive an end portion of a tripod leg in its socket and having a slot in one side thereof at a point sufficiently above the bottom of the socket to engage a projection on a tripod leg inserted therein, and pivoted means swinging in said slot to engage above said projection to hold the leg in the socket.

In witness whereof, I hereunto subscribe my name to this specification.

ARMEN POTIGIAN.